Nov. 21, 1961  H. E. PICKRELL, JR  3,009,587
CARGO VESSEL

Filed Aug. 3, 1959

Hugh E. Pickrell, Jr.
INVENTOR

BY Ramsey and Kolisch
Attys.

Nov. 21, 1961 H. E. PICKRELL, JR 3,009,587
CARGO VESSEL
Filed Aug. 3, 1959 3 Sheets-Sheet 2
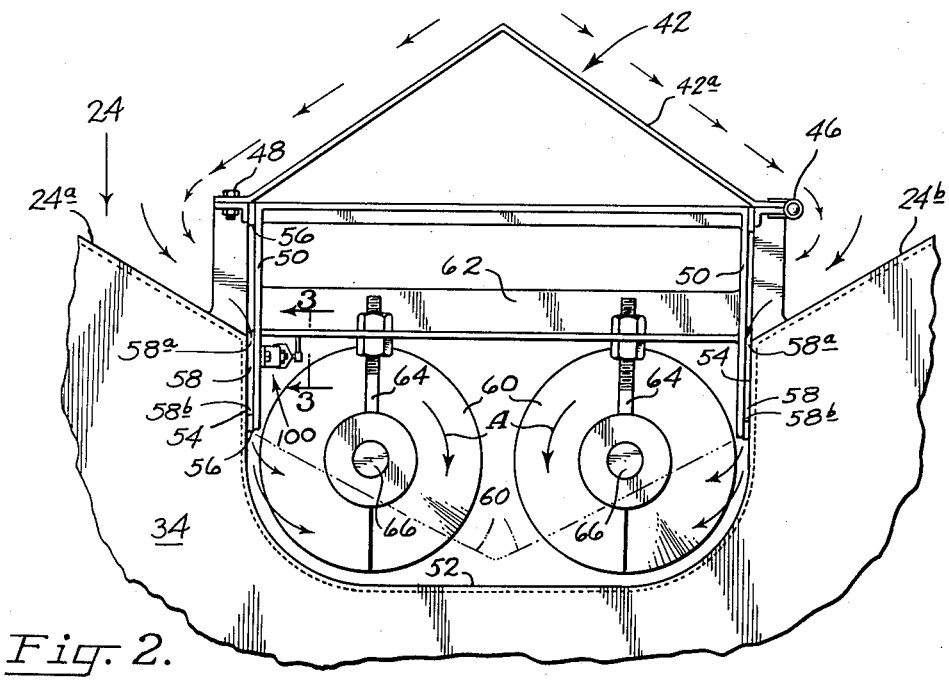
Fig. 2.
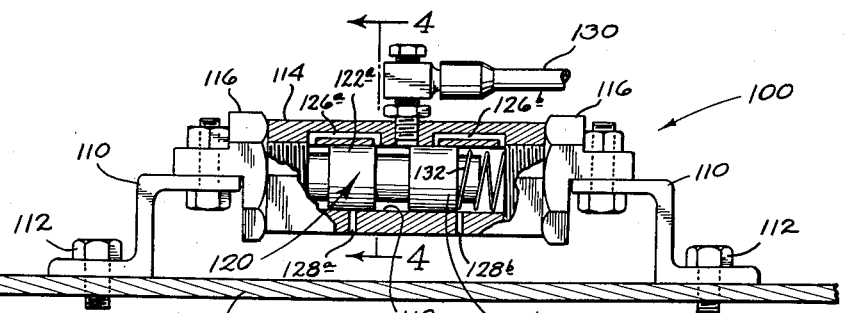
Fig. 3.
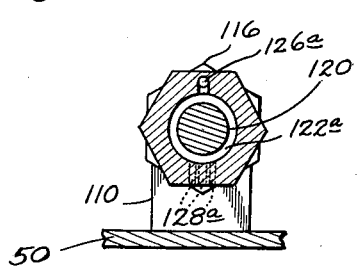
Fig. 4.
Hugh E. Pickrell, Jr.
INVENTOR
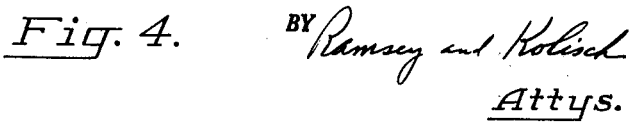
Attys.

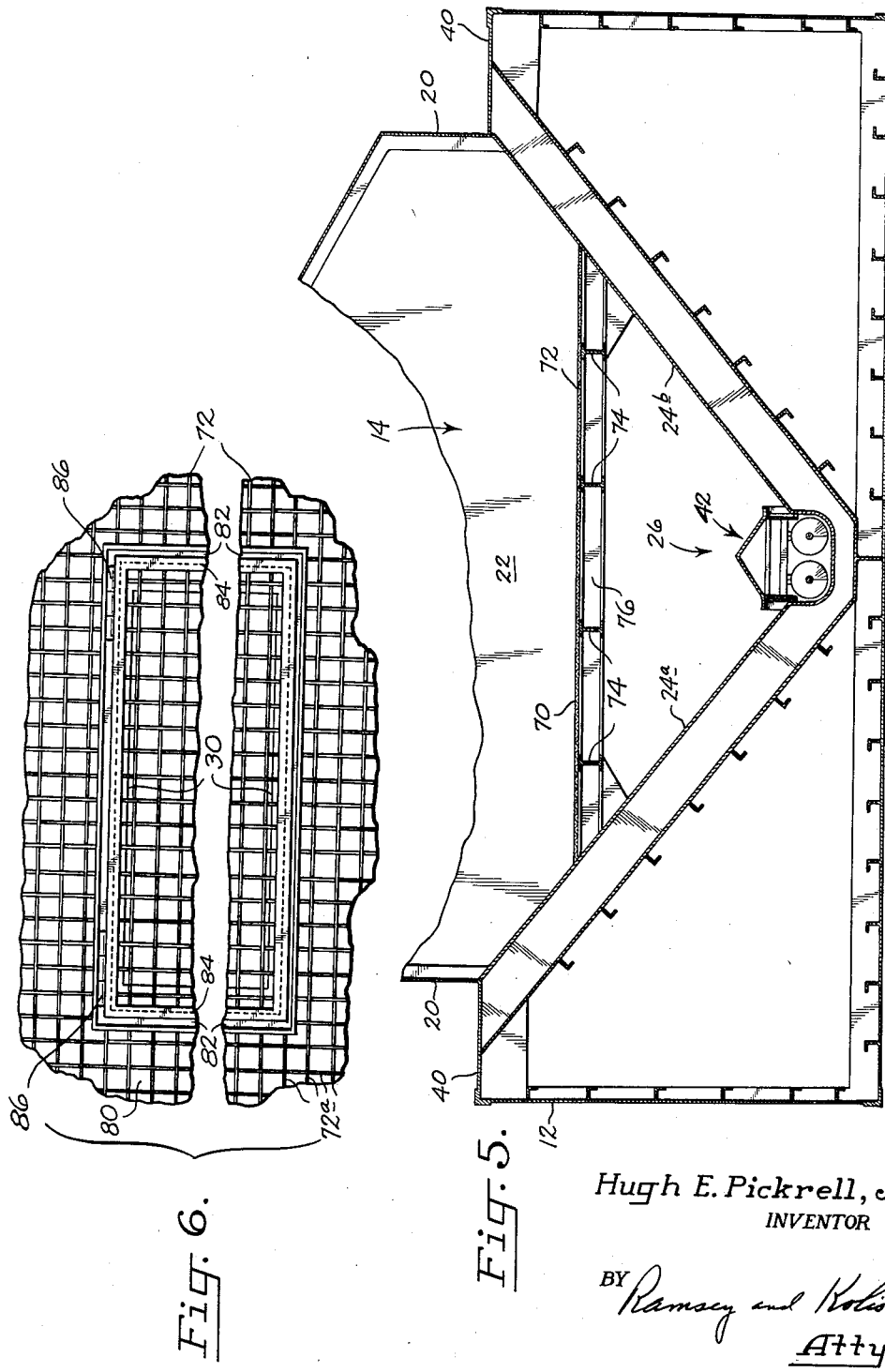

United States Patent Office 3,009,587
Patented Nov. 21, 1961

3,009,587
CARGO VESSEL
Hugh E. Pickrell, Jr., Vancouver, Wash., assignor to R. P. T. Z. Patco Inc., Portland, Oreg., a corporation of Oregon
Filed Aug. 3, 1959, Ser. No. 831,273
3 Claims. (Cl. 214—15)

This invention relates to cargo vessels for handling varied cargoes including such fungible and particle materials as grains, salt and the like, and bulk articles such as packaged goods, lumber, drums, machinery, etc. The vessel features an improved construction wherein particle matter carried in the vessel may be unloaded automatically with a minimum of supervision, and with regulated flow of material from selected locations in the vessel, whereby listing of the vessel to one side and tipping at one end may be controlled. The vessel also features a novel false bottom construction, providing support for bulk articles, but accommodating the screened flow of particle matter therethrough and into the unloading mechanism when the vessel is used to transport grain and the like.

Movement by water is an economical operation where suitable waterways exist. Ships and barges, for most efficient operation, should be able to handle multiple types of cargoes and handle these with equal facility. This is so since in many instances the type of cargo handled while traveling in one direction will differ materially from the type of cargo handled on a return trip. This invention contemplates a cargo vessel provided with a bin for holding fungible materials such as grain and the like, so constructed that the vessel can be loaded substantially to its full displacement with the material, and subsequently unloaded with the unloading taking place substantially entirely by automatic means. In addition, the vessel features loading platform structure included within the confines of the bin wherein the vessel may be loaded substantially to its full displacement with bulk articles such as drums and the like, and this may be done without sacrifice of convenience in loading and unloading such bulk articles.

Specifically, according to this invention a vessel is provided with an elongated storage bin which extends longitudinally of the vessel. The bottom of the vessel is constructed and arranged to promote the flow of particle matter disposed along the length and breadth of the bin into an unloading means provided the base of the bin. Superimposed over this unloading means and extending over the bottom of the bin is a false bottom structure. This provides a support for bulk articles, whereby these articles may be deposited within the bin and subsequently unloaded in an orderly fashion, with the articles carried above the unloading means and sloping walls provided the base of the bin.

In the handling of fungibles such as grain, it has been found practical to provide a vessel with an unloading means that includes as a permanent part of the vessel an elongated conveyor mechanism. The conveyor mechanism ordinarily is shielded to prevent the same from becoming engulfed with grain and thus made inoperable. According to this invention, the conveyor mechanism is encased in an elongated unloading tunnel means extending longitudinally of the bin. Rather than using valves or gates to control the flow of grain into the tunnel, an elongated, constricted feed passage means is provided that constitutes an elongated ribbon opening connecting the interior of the bin with the interior of the tunnel. This is so disposed that grain, on falling through the opening and assuming its natural angle of repose in the tunnel, only partially envelopes the conveyor mechanism, leaving it free to be stopped and started at will. The use of such an elongated feed passage means introduces the problem of controlling the feed of grain at locations spaced along its length, so that unduly large amounts of material are not withdrawn from an isolated location and proper balance of the vessel may be maintained. There is also the problem of providing means to take care of bridging of the grain over the inlet of the passage, such bridging tending to block flow therethrough.

An object and feature of the invention is the provision of vibrator means in conjunction with the narrow feed passage to afford control of the feed rate into the tunnel means. Preferably plural vibrator mechanisms are provided, and these are disposed adjacent the base of the bin and spaced at intervals along the length of the tunnel means. These vibrator mechanisms may be actuated selectively to produce vibration and shaking of selected locations of the walls defining the feed passage. Such shaking serves the double function of breaking down any bridging that may have occurred over the narrow inlet that is provided the feed passage, and providing a means for controlling the flow of grain whereby the flow rate may be increased at selected locations. The former inhibits flow stoppage due to bridging of the grain, and the latter affords a means for correcting tilting of the vessel.

In the handling of grain and other fungibles, foreign objects such as crowbars, wrenches and other tools through misplacement often become imbedded within the grain. Such articles can cause closing of the feed passage and disrupt unloading, or if they fall into the unloading tunnel, can cause considerable damage to any conveyor mechanism. Thus it is another object of the invention to provide a false bottom for the vessel that takes the form of a perforate or reticulate floor disposed between the sides of the bin and over the feed passage of the unloading tunnel. Openings in the floor accommodate the screened flow of material therethrough and into the space above the feed passage, whence material may flow into the unloading tunnel. The provision of such a floor to perform this screening action is important in maintaining continuous operation.

Still another object of the invention is to provide, in a vessel having a bin with a bottom configured to accommodate the automatic unloading of grain and the like, a false bottom spaced above the bin bottom for the support of bulk articles, such bottom being perforate and permitting the flow of fungibles therethrough so that the bottom may become an integral part of the vessel and need not be removed. A perforate false bottom does not interfere with the use of the vessel as a means for transporting grain, but in fact implements its use as discussed above. Such a bottom also automatically provides a support for bulk articles such as drums and the like without the need of doing any assembly in the vessel prior to transporting such bulk articles. The construction makes possible substantial savings in labor costs and reductions in idle time.

Other objects and advantages are attained by the invention, the same being described hereinbelow in conjunction with the accompanying drawings, wherein:

FIG. 2 is a section view, slightly enlarged, along the line 2—2 in FIG. 1 and illustrating details of an unloading conveyor mechanism present;

FIG. 3 is an enlarged view along the line 3—3 in FIG. 2, illustrating details of a vibrator mechanism in the construction, with portions of the mechanism removed;

FIG. 4 is a section view along the line 4—4 in FIG. 3;

FIG. 5 is an enlarged section view along the line 5—5 in FIG. 1, illustrating a construction for the false bottom in the vessel; and FIG. 6 is a a plan view of the false bottom, as it appears over the location of a center collection pit provided the bin.

Figure 1:
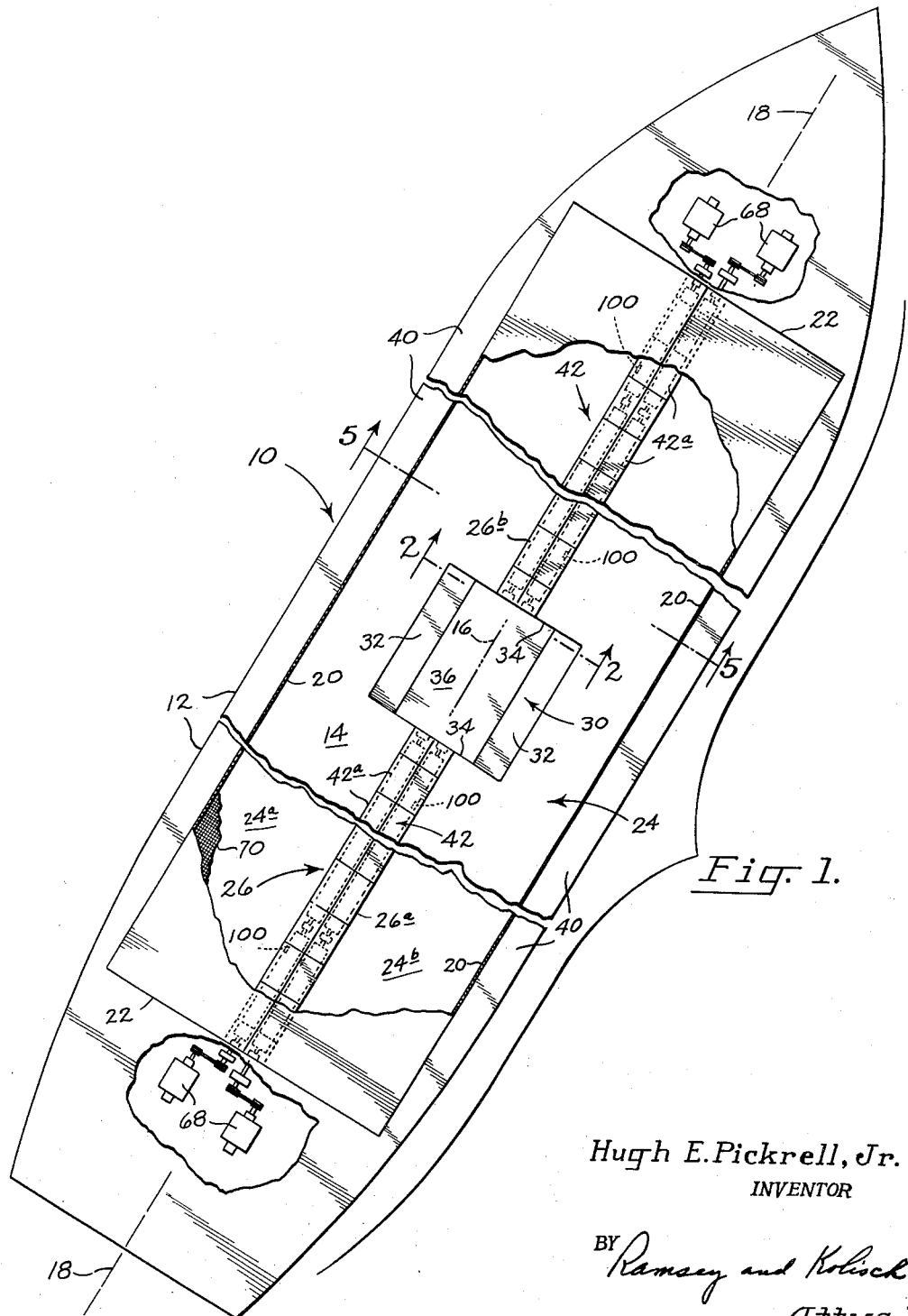
FIG. 1 is a plan view with portions removed of a vessel constructed according to an embodiment of the invention, showing an elongated storage bin in the vessel and means at the base thereof automatically for unloading fungible material.

Referring now to the drawings, and more particularly to FIGS. 1 and 2, 10 indicates generally a barge, such as may be used for transporting grain or salt. The barge comprises a hull 12 and within the hull an elongated cargo or storage bin 14 with the midline 16 thereof in substantial vertical alignment with the centerline 18 of the vessel. Bin 14 is constructed to accommodate the automatic unloading of grain deposited therein. Thus the bin has side walls 20 and end walls 22 that join with a bottom 24 designed to feed material to an unloading tunnel means 26 that extends longitudinally of the bin and is disposed substantially vertically over the centerline of the vessel. In the embodiment illustrated, bottom 24 comprises left- and right-hand portions 24a, 24b that slope downwardly from the sides of the bin toward the unloading tunnel means 26. These sloping portions direct grain carried in the bin in substantially equal proportions from both sides of the vessel toward the unloading tunnel means, and since the bin is balanced substantially over the centerline of the vessel, in this way lateral stability of the vessel is maintained.

Centrally of bin 14 is a collection pit 30 defined by sloping side walls 32, end walls 34 and bottom 36. Tunnel means 26 comprises two tunnel portions 26a and 26b, and these portions have inner ends that open to the collection pit. In operation, material is dumped from the inner ends of the tunnel portions into the pit 30, and material deposited in the collection pit is removed from the vessel using conventional mechanism such as a "sucker," a "marine leg," or similar type of equipment found at the usual loading and unloading dock.

Referring now to FIGS. 1 and 5, a deck for the barge is indicated at 40. Sides 20 of the bin and end walls 22 are extended upwardly from deck 40 to provide storage spaced disposed above the level of deck 40. A barge so constructed can be loaded substantially to its full displacement with grain, with the entire grain load unloaded automatically using unloading tunnel means 26.

Considering now the construction of unloading tunnel means 26, in the embodiment shown there is provided a cover structure indicated generally at 42 forming the top of the tunnel means, and supported above bottom portions 24a, 24b by standards 44 (see FIGS. 1 and 2). Preferably cover structure 42 is made up of a series of separate cover portions 42a, each of which is held in place along one side of the tunnel means by hinges 46 and along the opposite side by nut and bolt connections 48. The cover portions have inverted V-shaped cross sections. By using separate cover portions 42a, isolated parts of the cover structure may be swung open to permit inspection and repair of the interior of the tunnel means. Completing each tunnel portion are side plate portions 50 and a bottom plate portion 52 that curves upwardly and joins with plate extensions or portions 54 that overlap the bottoms of side plate portions 50. The side plate portions are spaced toward the centerline of the vessel from extensions 54 by block spacers 56. The overlapped portions of the extensions and side plate portions define an elongated ribbon opening or feed passage means extending along each side of the tunnel means and indicated at 58. The plate portions are vertical and thus the two feed passage means have substantial vertical components. The two feed passage means extend substantially the length of the tunnel means, and connect the interior of the tunnel means with the interior of bin 14. Fungible material such as grain is directed into the top or inlet ends of the feed passages 58 (indicated in FIG. 2 at 58a) by bottom portions 24a, 24b and by the sloping tops of cover portions 42a. As can be seen with reference to FIG. 5, the cross section of the tunnel portions is minor compared to the cross section of the bin, and thus either of the feed passages 58, should the other become clogged, can be used in the removal of grain from the bin with substantially complete unloading resulting.

Extending longitudinally along each tunnel portion are a pair of conveyor screws 60 constituting conveyor means in the construction. These are supported directly above bottom plate 52 and intermediate the sides of the tunnel by transverse frame members 62 and hangers 64. The conveyor screws include screw shafts 66 that are rotated by motors indicated at 68. In operation, the conveyor screws are rotated in the direction of the arrows A in FIG. 2, with the flights of the screws moving from the base of a tunnel portion toward its sides. The flights of the screws turn through the material and at the same time advance it forwardly toward collection pit 30. The outlets of feed passages 58 (indicated at 58b) are to one side of the sides of the conveyor screws and spaced above plate portions 52 a distance selected so that grain, upon falling from the outlets and into the tunnel and assuming its natural angle of repose (indicated at 60) does not completely imbed the screws but only partially covers them. This leaves the screws in condition to be started and stopped at will.

A feature of the invention is the provision of a support in the vessel for the loading thereon of bulk articles. Thus, and referring to FIGS. 1, 5 and 6, disposed above the tunnel means 26 and extending between opposite sides of bin 14 is a reticulate floor or false bottom 70. (This is partially broken away in FIG. 1.) In the embodiment shown, this comprises a metal grating 72 disposed in substantially a horizontal plane and having a flat upper surface for the loading of bulk articles such as drums thereon. The grating 72 is supported above the tunnel means and the base of the bin by longitudinals 74 and transverse members 76. The crossed strips 72a that make up grating 72 have spaces thereinbetween (indicated at 80) that constitute a perforate means formed in bottom 70 accommodating the screened flow of fungible material through the bottom. This has the double advantage of (1) enabling the grating to sift out foreign objects such as tools, etc., that may be lodged within a grain load, and (2) permitting the grating normally to be an integral part of the vessel and thus ordinarily not removed therefrom. The bottom may be loose at the bottom of the bin, or it may be fixed in place by means such as welding and the like, or by detachable means such as screws. In any event, the grating normally need not be removed from the vessel when handling a load of fungible material, as it performs the important sifting function described hereinabove. On a subsequent trip, however, should the vessel be used to move bulk articles, the grating provides an expansive support surface that may be loaded and unloaded in an orderly fashion using conventional techniques. At the same time, the grating protects the sloping bottom walls and cover structure 42 from damage. The grating preferably is positioned low enough in the bin to enable the bin to be loaded substantially to its full displacement using bin space disposed above the grating.

Referring now more particularly to FIG. 6, centrally of bin 14 and over pit 30 the grating is provided with an opening 82 that may be closed by a swinging section 84 hinged at one side by means of hinges 86. Swinging section 84, in the position of FIG. 6, forms a continuation of the grating and provides additional support directly over pit 30. When grain is handled, this section may be swung aside to accommodate the insertion of a "sucker" or other unloader through opening 82 and into pit 30.

As already indicated hereinabove, because inlets 58a are relatively narrow, bridging of grain may tend to occur over the inlets stopping flow through the feed passages 58. Further, in the absence of any gates or valves controlling the feed through the inlets, it is preferable to include mechanism whereby flow through the feed passages at selected locations along the length of the tunnel means may be varied, and tipping of the vessel at its bow or stern may be checked. Thus, staggered along conveyor tunnel means 26 and adjacent the base of the bin are a plural number of vibrator mechanisms, indicated at 100. Each is mounted on the inner faces of side plate portions 50, as illustrated in FIGS. 2 and 3, at approximately the location of transverse member 62. Thus each is connected to the means defining the feed passages 58. When a vibrator mechanism is actuated, it produces vibration and shaking of the side plate portion to which it is affixed. The side plate portion 50 directly opposite the mechanism is also vibrated, with vibration being transmitted to this other side plate portion through member 62. On actuation of a vibrator mechanism, a type of pumping action is set up in the feed passages, which accelerates the flow of material therethrough and which tends to break down any bridging that may be present. By spacing the vibrator mechanisms along the tunnel means, and actuating selected ones, controlled flow from the bin at selected locations is possible.

The vibrator mechanisms are of similar construction and only one of them is described in detail. Specifically, and referring to FIGS. 3 and 4, each vibrator is secured in place through brackets 110 connected as by screws or connections 112 with the plate portion 50 mounting the same. The mechanism includes a hollow housing 114 closed at its ends by screw plugs 116. The interior 118 of the housing slidably accommodates a shiftable element 120. Element 120 has enlargements 122a, 124b used in regulating the flow of air through two sets of inlet passages 126a, 126b and two sets of exhaust passages 128a, 128b. Air under pressure is admitted to the mechanism through supply conduit 130. A spring 132 normally urges the element 120 to the position of FIG. 3 when the mechanism is at rest.

Explaining the operation of the vibrator mechanism, as already indicated, spring 132 positions element 120 prior to actuation of the mechanism. When air under pressure is first introduced through conduit 130, the air passes through inlets 126a to the left end of the spool. This throws the spool violently against the right screw plug 116 which jars the mechanism. On moving to the right of the housing, inlets 126a are closed by enlargement 122a and inlets 126b are opened. Further, exhausts 128a are opened and exhausts 128b are closed. After reaching the right-hand end of the housing, the operation is reversed and air under pressure is introduced to the right end of element 120 causing it to move from right to left. This throws the spool violently against the left screw plug 116, causing a jar in the mechanism and completing the cycle of operation.

It should be obvious from the description that the vessel of the invention incorporates a number of novel features which contribute to economical and versatile operation. The presence of the false bottom 70 over the discharging means of the bin enables the vessel to be used with equal facility for transporting either bulk or fungible material such as salt or grain. The vessel may be constructed with a bottom formed to accommodate automatic unloading without detracting from the vessel's use as a bulk cargo carrier. The false bottom 70 is made perforate, enabling the bottom to be retained in place whatever the use of the vessel, eliminating the need for reassembly of the bottom each time the vessel is first used for bulk goods, and the need for storing the bottom parts during use of the vessel for fungible material.

The vessel is further provided with conveyor mechanism for unloading fungible material that requires little supervision and performs the unloading operation substantially automatically. The elongated feed passages control the flow of grain without the necessity of using gates or shut-offs. The conveyor screws are protected from becoming overloaded. Regulation of the flow from selected locations of the bin is possible through actuation of selected vibrator mechanisms 100. These also may be used to prevent bridging over the inlets to the feed passages.

Reticulate bottom 70 has particular utility in conjunction with the unloading construction described, since it serves to filter out foreign articles that would hinder the discharge of material through the feed passages or cause damage to the screws 50.

It is claimed and desired to secure by Letters Patent:

1. In a cargo vessel, an elongated storage bin extending longitudinally of the vessel, elongated unloading tunnel means extending longitudinally of the bin adjacent the base of the bin, means defining an elongated constantly opened and constricted feed passage means extending substantially the length of the unloading tunnel means connecting the interior of the bin with the interior of the unloading tunnel means, said feed passage means being constructed to restrain the flow of material into the unloading tunnel means and constituting a means providing continuously restrained flow of material to the unloading tunnel means from substantially the entire bin, said bin having a bottom sloping downwardly toward the feed passage means, plural power-actuated vibrator mechanisms adjacent the bottom of the bin spaced along the length of said unloading tunnel means, the latter being connected to the means defining the feed passage means whereby actuation of a vibrator mechanism produces vibration of the feed passage means, and conveyor means within said unloading tunnel means for transporting material from out of the tunnel means, actuation of selected vibrator mechanisms controlling the flow of material from selected portions of the bin through the feed passage means and into the unloading tunnel means.

2. In a cargo vessel, an elongated storage bin extending longitudinally of the vessel with the longitudinal midline thereof in substantial vertical alignment with the centerline of the vessel, an elongated unloading tunnel means adjacent the base of the bin and extending substantially over the centerline of the vessel, means defining an elongated constantly opened and constricted feed passage means connecting the interior of the bin with the interior of the unloading tunnel means and extending substantially the length of the unloading tunnel means, said feed passage means being constructed to restrain the flow of material into the unloading tunnel means and constituting a means continuously restraining flow of material to the unloading tunnel means from substantially the entire bin, said bin having a bottom sloping downwardly from the sides of the bin toward said feed passage means, plural power-actuated vibrator mechanisms adjacent said feed passage means and spaced along the length thereof, said vibrator mechanisms being connected to the means defining the feed passage means whereby actuation of a vibrator mechanism produces vibration of the feed passage means, and conveyor means within said unloading tunnel means for transporting material from out of the unloading tunnel means, actuation of selected vibrator mechanisms controlling the flow of material from selected portions of the bin through the feed passage means and to the unloading tunnel means.

3. In a grain-handling cargo vessel, an elongated storage bin extending longitudinally of the vessel with the longitudinal midline thereof in substantial vertical alignment with the centerline of the vessel, elongated unloading tunnel means adjacent the base of the bin and extending substantially over the centerline of the vessel, means defining an elongated constantly opened and constricted feed passage means connecting the interior of the bin with the interior of the unloading tunnel means and extending substantially the length of the unloading tunnel means, said feed passage means being constructed to restrain the flow of grain into the unloading tunnel means and constituting a means providing constricted restrained flow of grain to the unloading tunnel means from substantially the entire bin, a screen extending between the sides of the bin and disposed above the constricted feed passage means for screening out articles such as tools and the like from grain, said bin having a bottom sloping downwardly from the sides of the bin toward said feed passage means, plural power-actuated vibrator mechanisms adjacent said feed passage means and spaced along the length thereof, each of said vibrator mechanisms being connected to the means defining the feed passage means whereby actuation of the vibrator mechanism produces vibration of a selected portion of the feed passage means, and conveyer means within said unloading tunnel means for transporting grain from out of the unloading tunnel means, actuation of selected vibrator mechanisms controlling the flow of grain from selected portions of the bin through the feed passage means and into the unloading tunnel means.

References Cited in the file of this patent

UNITED STATES PATENTS

| | | |
|---|---|---|
| 833,761 | Stevens | Oct. 23, 1906 |
| 2,440,306 | Smith | Apr. 27, 1948 |
| 2,889,942 | Russell | June 9, 1959 |

OTHER REFERENCES

Cleveland Vibrator Co. Catalog 109, August 1, 1954, page 2. (Copy in Division 4.) 214–64.2.